United States Patent
Doi et al.

(10) Patent No.: US 8,856,010 B2
(45) Date of Patent: Oct. 7, 2014

(54) APPARATUS AND METHOD FOR DIALOGUE GENERATION IN RESPONSE TO RECEIVED TEXT

(75) Inventors: Miwako Doi, Kawasaki (JP); Yuka Kobayashi, Kawasaki (JP); Daisuke Yamamoto, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1241 days.

(21) Appl. No.: 12/561,624

(22) Filed: Sep. 17, 2009

(65) Prior Publication Data

US 2010/0076753 A1 Mar. 25, 2010

(30) Foreign Application Priority Data

Sep. 22, 2008 (JP) ................................. 2008-243046

(51) Int. Cl.
G10L 15/22 (2006.01)

(52) U.S. Cl.
CPC ...................................... *G10L 15/22* (2013.01)
USPC ......................................... 704/275; 704/270

(58) Field of Classification Search
CPC ...................................................... G10L 15/22
USPC .................................................. 704/270, 275
See application file for complete search history.

(56) References Cited

U.S. PATENT DOCUMENTS

| | | | | |
|---|---|---|---|---|
| 5,677,991 A * | 10/1997 | Hsu et al. | ....................... | 704/255 |
| 5,855,000 A * | 12/1998 | Waibel et al. | ................... | 704/235 |
| 6,064,959 A * | 5/2000 | Young et al. | ................... | 704/251 |
| 6,308,151 B1 * | 10/2001 | Smith | ........................... | 704/235 |
| 6,330,537 B1 * | 12/2001 | Davis et al. | ..................... | 704/257 |
| 6,507,643 B1 * | 1/2003 | Groner | ........................ | 379/88.14 |
| 6,513,006 B2 * | 1/2003 | Howard et al. | ................ | 704/257 |
| 7,570,746 B2 * | 8/2009 | Takeda et al. | .............. | 379/88.04 |
| 2001/0053977 A1 * | 12/2001 | Schaefer | .................... | 704/270.1 |
| 2003/0050778 A1 * | 3/2003 | Nguyen et al. | ................ | 704/235 |
| 2003/0078783 A1 * | 4/2003 | Yamamoto et al. | ........... | 704/273 |

(Continued)

FOREIGN PATENT DOCUMENTS

| | | |
|---|---|---|
| JP | 3-289854 A | 12/1991 |
| JP | 2002-041081 A | 2/2002 |

(Continued)

OTHER PUBLICATIONS

U.S. Appl. No. 12/544,430, Kobayashi, et al., filed Aug. 20, 2009.

(Continued)

*Primary Examiner* — Jialong He
(74) *Attorney, Agent, or Firm* — Ohlandt, Greeley, Ruggiero & Perle, L.L.P.

(57) ABSTRACT

A dialog generation apparatus includes a reception unit configured to receive a first text from a dialog partner, an information storage unit configured to store profile information specific to a person who can be the dialog partner and a fixed-pattern text associated with the person, a presentation unit configured to present the first text to a user, a speech recognition unit configured to perform speech recognition on speech the user has uttered about the first text presented to the user, and generate a speech recognition result showing the content of the speech, a generation unit configured to generate a second text from the profile information about the dialog partner, fixed-pattern text about the dialog partner, and the speech recognition result, and a transmission unit configured to transmit the second text to the dialog partner.

8 Claims, 10 Drawing Sheets

(56) References Cited

U.S. PATENT DOCUMENTS

| | | | |
|---|---|---|---|
| 2003/0130849 A1* | 7/2003 | Durston et al. | 704/270 |
| 2003/0223556 A1* | 12/2003 | Ju et al. | 379/93.24 |
| 2004/0078447 A1* | 4/2004 | Malik et al. | 709/206 |
| 2004/0122673 A1* | 6/2004 | Park et al. | 704/270 |
| 2005/0108338 A1* | 5/2005 | Simske et al. | 709/206 |
| 2005/0288935 A1* | 12/2005 | Lee et al. | 704/270 |
| 2006/0149551 A1* | 7/2006 | Ganong et al. | 704/270.1 |
| 2006/0287868 A1* | 12/2006 | Ikeda et al. | 704/275 |
| 2010/0049500 A1 | 2/2010 | Kobayashi et al. | |

FOREIGN PATENT DOCUMENTS

| | | |
|---|---|---|
| JP | 2002-304407 A | 10/2002 |
| JP | 2002-351791 A | 12/2002 |
| JP | 2003-099089 A | 4/2003 |
| JP | 2003-115929 A | 4/2003 |
| JP | 2003-187359 A | 7/2003 |
| JP | 2004-102523 A | 4/2004 |
| JP | 2004-145541 A | 5/2004 |
| JP | 2004-233577 A | 8/2004 |
| JP | 2006-172110 A | 6/2006 |
| JP | 2006-172410 A | 6/2006 |
| JP | 2008-052449 A | 3/2008 |

OTHER PUBLICATIONS

Japanese Office Action dated Mar. 27, 2012 from corresponding JP 2008-243046.

* cited by examiner

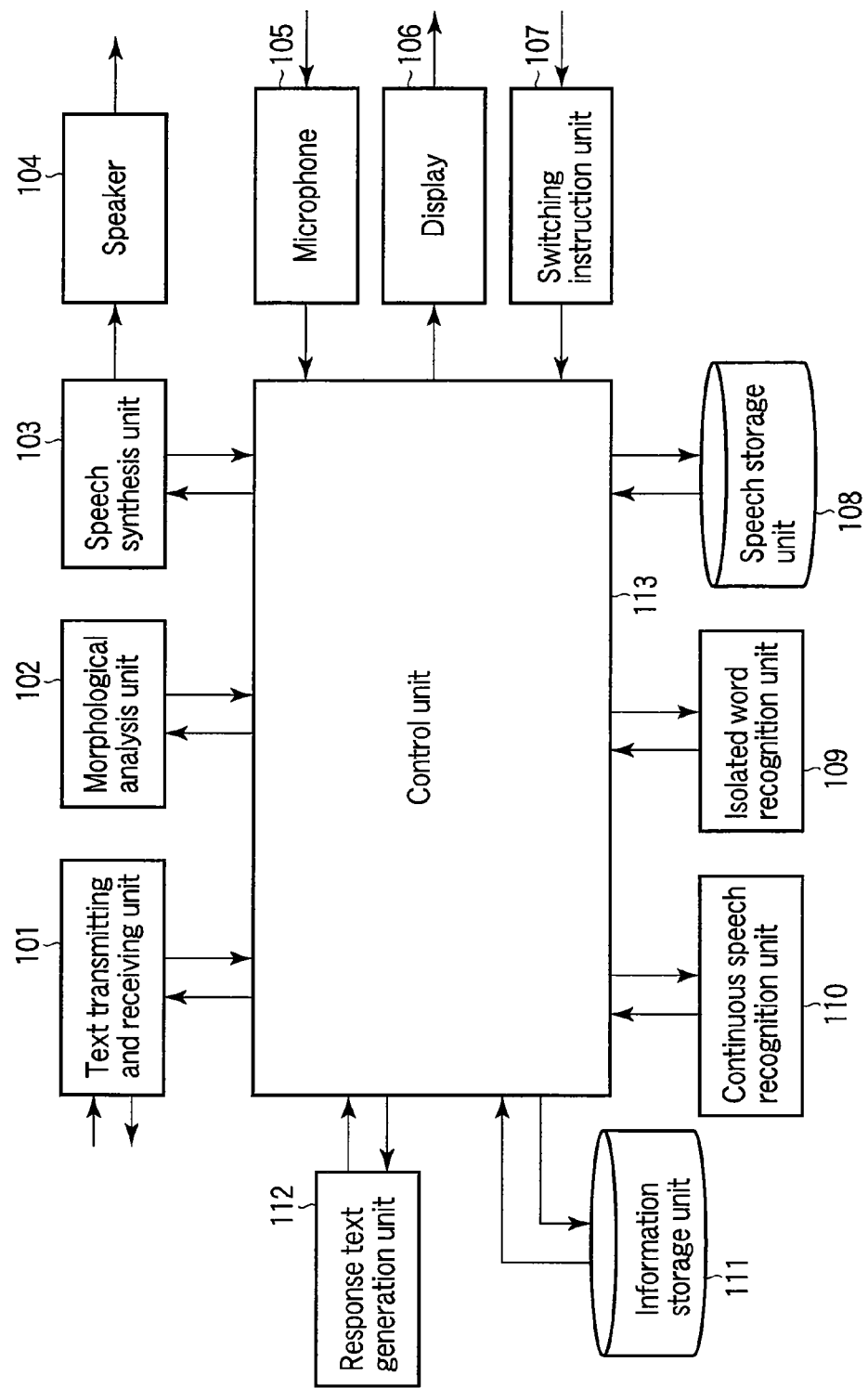
F I G. 1

| Speech recognition result | Associated phrase input again |
|---|---|
| いない | ひいていないよ |
| タイ | 大丈夫だよ、 |
| 頼み | 楽しみにしているよ |
| 早く | 早く来てね |

FIG. 8

| Address | Associated text |
|---|---|
| miwako@softobank.jp | みわこちゃん |
| nao@dicomo.jp | なおみ君 |
| yuuki@ou.jp | 裕樹さん |
| abc@softobank.jp | おかあさん |
| : | : |

FIG. 9

```
To : miwako@softobank.jp
From : abc@softobank.jp
Subject : RE : ひさしぶり

| Speech recognition result | Associated phrase input again |
|---|---|
| いない タイ 頼み 早く | ひいていないよ、<br>大丈夫だよ、<br>楽しみにしているよ<br>早く来てね |

FIG. 11

```
To : miwako@softobank.jp
From : abc@softobank.jp
Subject : RE : ひさしぶり

| Date | Appliance type | Attribute |
|---|---|---|
| June 21, 2008 12:00 – 12:30 | Microwave oven | 塩鮭 |
| June 21, 2008 19:00 – 10:20 | Microwave oven | 鶏の照焼き |
| June 21, 2008 19:25 – 19:30 | Microwave oven | お酒 |
| June 21, 2008 19:30 – 21:15 | TV | プロ野球巨阪－ソフトクリーム戦 |
| : | : | : |

FIG. 14

| Date | Appliance type | Additional text |
|---|---|---|
| | | Nickname 「ロボット」 |
| 4:00 – 11:00 | P | 朝に |
| 11:00 – 14:00 | P | 昼に |
| 17:00 – 24:00 | P | 夜に |
| | Microwave oven | 「(User)は」*(Attribute)を「食べたよ/飲んだよ」。「おいしかった?」* |
| | TV | 「(User)は」*(Attribute)を見たよ。「おもしろかった?」* |
| | NULL | きょうは具合が悪いのかな。それとも旅行にいっているのかな。 |
| : | : | : |

FIG. 15

| Appliance type | subject |
|---|---|
| TV | TV見たよ |
| Microwave oven | 食べたよ |
| A | 元気だよ |
| N | ちょっとね |
| : | |

FIG. 16

```
To : miwako@softobank.jp
From : abc@softobank.jp
Subject : 今日はTV見たよ

APPARATUS AND METHOD FOR DIALOGUE GENERATION IN RESPONSE TO RECEIVED TEXT

CROSS-REFERENCE TO RELATED APPLICATIONS

This application is based upon and claims the benefit of priority from prior Japanese Patent Application No. 2008-243046, filed Sep. 22, 2008, the entire contents of which are incorporated herein by reference.

BACKGROUND OF THE INVENTION

1. Field of the Invention

The present invention relates to a dialogue generation apparatus and a dialogue generation method, each utilizing a speech recognition process.

2. Description of the Related Art

In recent years, many users have come to use various types of dialogue means, such as electronic mail, electronic chat and bulletin board system (BBS). The electronic mail, electronic chat and bulletin board system are text-based dialogue means that achieve an exchange of comparatively short text between the users, unlike telephone and voice chat that are voice-based dialogue means. To use the text-based dialogue means, any user operates a text input interface used as input means, such as a keyboard or the numeric keypad or touch panel provided on a cell phone. In order to enhance the usability of text input, thereby to enable the users to enjoy rhythmical dialogues, text input interfaces based on speech recognition are used in some cases.

In the speech recognition process, the user's speech is converted sequentially into specific standby words on the basis of an acoustic viewpoint and a linguistic viewpoint, thereby generating language text composed of a string of standby words representing the contents of the speech. If the standby words are decreased, the recognition accuracy of individual words increases, but the number of recognizable words decreases. If the standby words are increased, the number of recognizable words increases, but the chances are greater that individual words will be recognized erroneously. Accordingly, to increase the recognition accuracy of the speech recognition process, a method of causing specific words expected to be included in the user's speech to be recognized preferentially or only the specific words to be recognized has been proposed. Known in the art is not only the continuous speech recognition for recognizing word strings such as so-called "continuous speech," but also the isolated word recognition for recognizing short words such as operating instructions or keywords input to apparatuses. The isolated word recognition is superior to the continuous speech recognition in terms of recognition accuracy of specific words.

With the electronic mail communication apparatus disclosed in JP-A 2002-351791, since a format for writing standby words in an electronic mail text has been determined previously, standby words can be extracted from the received mail according to the format. Therefore, with the electronic mail communication apparatus disclosed in JP-A 2002-351791, high recognition accuracy can be expected by preferentially recognizing the standby words extracted on the basis of the format. In the electronic mail communication apparatus disclosed in JP-A 2002-351791, however, if the specific format is not followed, standby words cannot be written in the electronic mail text. That is, in the electronic mail communication apparatus disclosed in JP-A 2002-351791, since the format of dialogue is limited, the flexibility of dialogue is impaired.

With the response data output apparatus disclosed in JP-A 2006-172110, an interrogative sentence is estimated from text data on the basis of a sentence end used at the end of an interrogative sentence. If there are specific paragraphs, including "what time" and "where," in the estimated interrogative sentence, words representing time and place are recognized preferentially according to the respective paragraphs. If none of specific paragraphs, including "what time" and "where," are present in the interrogative sentence, words, including "yes" and "no," are recognized preferentially. Accordingly, with the response data output apparatus disclosed in JP-A 2006-172110, high recognition accuracy can be expected in the user's speech response to an interrogative sentence. On the other hand, the response data output apparatus does not improve the recognition accuracy in a response to a declarative sentence, an exclamatory sentence, and an imperative sentence other than an interrogative sentence.

With the speech-recognition and speech-synthesis apparatus disclosed in JP-A 2003-99089, input text is subjected to morphological analysis and only the words constituting the input text are used as standby words, which enables high recognition accuracy to be expected for the standby words. However, the speech-recognition and speech-synthesis apparatus disclosed in JP-A 2003-99089 has been configured to achieve menu selection, the acquisition of link destination information, and the like, and recognize only the words constituting the input text. That is, a single word or a string of a relatively small number of words has been assumed to be the user's speech. However, when text (return text) is input, words not included in the input text (e.g., incoming mail) have to be recognized.

Note that the accuracy of speech recognition is influenced by environmental factors. If the input speech contains relatively large noise, the content of the input speech may not be fully reflected in the speech recognition result. Consequently, the user needs to input the speech repeatedly or give up inputting the speech.

The above-mentioned text-based dialogue means may be used to accomplish periodic dialogue with a family member living in a far-off location or a safety confirmation with an elderly person living alone. However, dialogues achieved by the text-based dialogue means may become flat and dull and hardly last long.

BRIEF SUMMARY OF THE INVENTION

According to an aspect of the invention, there is provided a dialogue generation apparatus comprising: a reception unit configured to receive a first text from a dialogue partner; an information storage unit configured to store profile information specific to a person who can be the dialogue partner and a fixed-pattern text associated with the person; a presentation unit configured to present the first text to a user; a speech recognition unit configured to perform speech recognition on speech the user has uttered about the first text presented to the user, and generate a speech recognition result showing the content of the speech; a generation unit configured to generate a second text from the profile information about the dialogue partner, fixed-pattern text about the dialogue partner, and the speech recognition result; and a transmission unit configured to transmit the second text to the dialogue partner.

BRIEF DESCRIPTION OF THE SEVERAL VIEWS OF THE DRAWING

FIG. 1 is a block diagram showing a dialogue generation apparatus according to a first embodiment;

FIG. 8 is a diagram showing example content of the speech storage unit shown in FIG. 1;

FIG. 9 is a diagram showing example content of the data storage unit shown in FIG. 1;

FIG. 10 is a diagram showing an example response that the text the response-text generation unit shown in FIG. 1 may generate;

FIG. 11 is a diagram showing further example content of the speech storage unit shown in FIG. 1;

FIG. 12 is a diagram showing another example response text that the response-text generation unit shown in FIG. 1 may generate;

FIG. 14 is a diagram showing example content of the use-history storage unit shown in FIG. 13;

FIG. 15 is a diagram showing example content of the template storage unit shown in FIG. 13;

FIG. 16 is a diagram showing another further content of the template storage unit shown in FIG. 13; and FIG. 17 is a diagram showing an example response text that the response-text generation unit shown in FIG. 13 may generate.

DETAILED DESCRIPTION OF THE INVENTION

Figure 2:
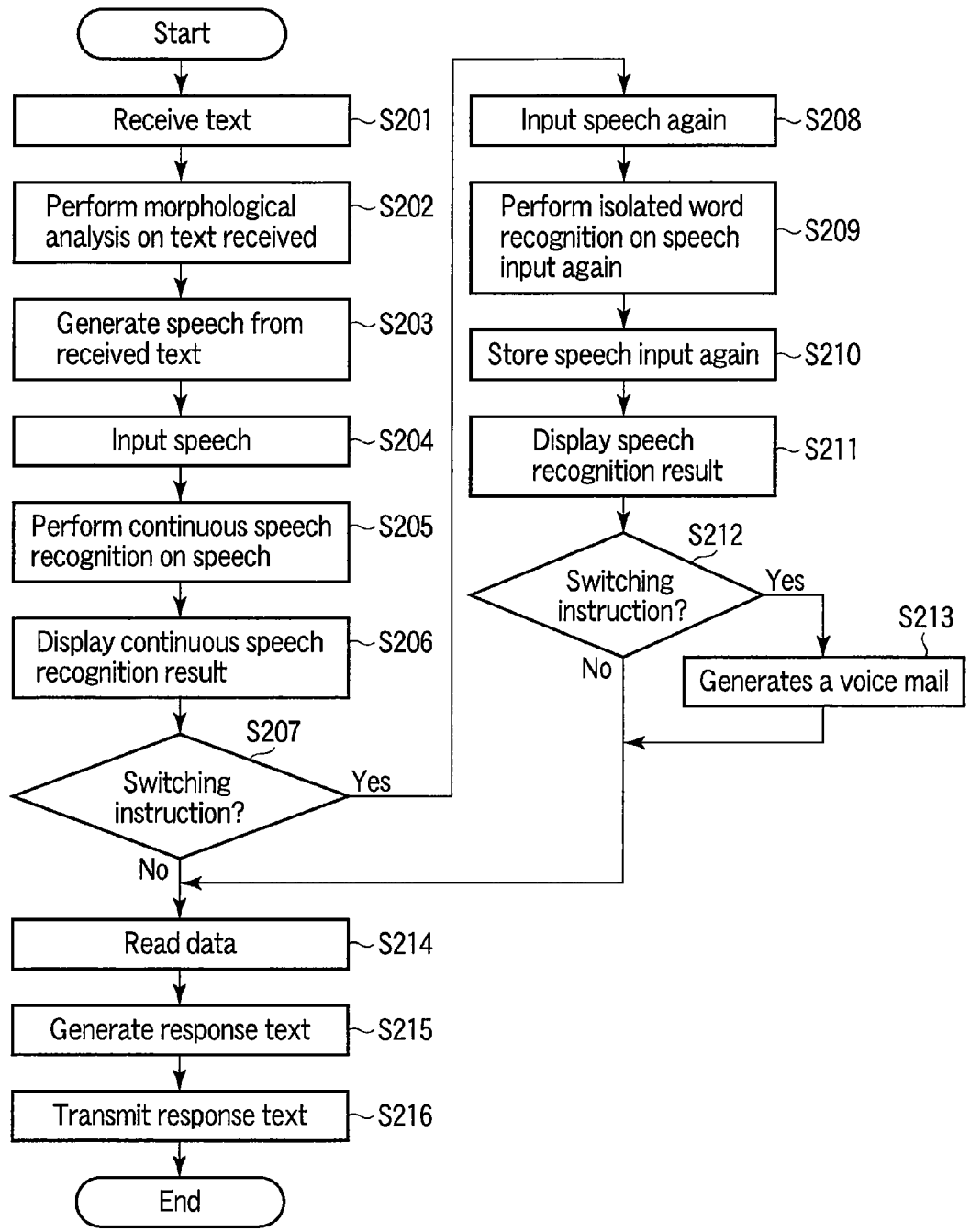
FIG. 2 is a flowchart explaining how the dialogue generation apparatus of FIG. 1 is operated.

Embodiments of the present invention will be described with reference to the accompanying drawings.

First Embodiment

As shown in FIG. 1, the dialogue generation apparatus according to a first embodiment of this invention has a text transmitting and receiving unit 101, a morphological analysis unit 102, a speech synthesis unit 103, a speaker 104, a microphone 105, a display 106, a switching instruction unit 107, a speech storage unit 108, a isolated word recognition unit 109, a continuous speech recognition unit 110, a data storage unit 111, a response-text generation unit 112, and a control unit 113.

The text transmitting and receiving unit 101 receives text from a person with whom the user would like to talk (hereinafter called "dialogue partner"). The unit 101 transmits text representing the response to the dialogue partner. (Hereinafter, the text from the dialogue partner will be referred to as "received text", and the text from user will be referred to as "response text.") The text is transmitted through a wired network or a wireless network, in compliance with a prescribed communication protocol, such as mail protocol. The text is transmitted in one of various forms, in accordance with the dialogue means used to engage in a dialogue between the user and the dialogue partner. For example, the text may be transmitted as an e-mail, a chat message, or a BBS contributed message. The received text may have an attached file, e.g., an image file and an audio file. Alternatively, the response text may have the attached file. In either case, the text transmitting and receiving unit 101 can receive and transmit the attached file. Further, if the file attached to the received text is text data, the attached file may be managed as similar to the received text. The text transmitting and receiving unit 101 inputs the received text to the morphological analysis unit 102, speech synthesis unit 103, display 106 and response-text generation unit 112, through the control unit 113.

The morphological analysis unit 102 performs morphological analysis on the text it has received from the control unit 113. Performing the morphological analysis, the morphological analysis unit 102 acquires the words that constitute the received text, and also the linguistic data about each word, such as the pronunciation, part of speech, basic form and conjugated form of the word. The morphological analysis unit 102 sends the results of the morphological analysis performed on the text, back to the control unit 113.

The speech synthesis unit 103 performs speech synthesis on the text received from the control unit 113, converting the text to an audio signal. The audio signal synthesized by the speech synthesis unit 103 is supplied to the speaker 104. From the audio signal, the speaker 104 generates speech, which the user may hear.

The microphone 105 receives speech the user has uttered and converts the speech into an audio signal. The audio signal is input to the continuous speech recognition unit 110. Further, the microphone 105 may receive the same speech the user has uttered again and may generate an audio data. The audio data is input via the control unit 113 to the speech storage unit 108 and isolated word recognition unit 109.

The display 106 is, for example, a liquid crystal display (LCD), an electroluminescent display, or the like. The display 106 can display the received text, the continuous speech recognition result, the isolated word recognition result, and the response text.

The switching instruction unit 107 receives from the user's instruction for switching the dialogue generation mode. The switching instruction unit 107 inputs the instruction to the control unit 113. The method of generating the response text will be explained later in detail. The switching instruction unit 107 can be implemented as, for example, buttons, switches or keys provided on the housing of the dialogue generation apparatus of FIG. 1, or buttons displayed on the display 106.

The continuous speech recognition unit 110 performs continuous speech recognition on the speech input to it. More specifically, the continuous speech recognition unit 110 converts the input speech to a linguistic text, based on the acoustic similarity between the input speech and the standby words (i.e., commonly used words) stored in a standby word storage unit (not shown) and on the linguistic reliability. The linguistic text thus obtained is composed of several standby words. The continuous speech recognition unit 110 supplies the speech recognition result, thus obtained, to the control unit 113. If the continuous speech recognition unit 110 fails to recognize the input speech, it generates a prescribed error message to inform the user of the recognition failure. The error message may be input via the control unit 113 to the speech synthesis unit 103 or the display 106. Further, the continuous speech recognition unit 110 may input the speech recognition result and a prescribed approval request message via the control unit 113 to the speech synthesis unit 103 or the display 106.

The isolated word recognition unit 109 starts operating when the user, who is dissatisfied with the result of the speech recognition performed by the continuous speech recognition unit 110, operates the switching instruction unit 107, inputting a switching instruction. Then, the isolated word recognition unit 109 inputs a message requesting the user to input the same speech again, through the control unit 113, to the speech synthesis unit 103 or the display 106. The isolated word recognition unit 109 performs isolated word recognition on the speech the user has input again via the microphone 105. To be more specific, the isolated word recognition unit 109 converts a part of the input speech to standby words, based on the acoustic similarity between the input speech and the standby words stored in the standby word storage unit (not shown) and on the linguistic reliability. The standby words the isolated word recognition unit 109 processes are more limitative than the standby words the continuous speech recognition unit 110. The isolated word recognition unit 109 supplies the speech recognition result to the control unit 113. If the isolated word recognition unit 109 fails to recognize the input speech, it generates a prescribed error message to inform the user of the recognition failure. If the isolated word recognition unit 109 successfully recognizes the input speech, it may input the speech recognition result and a prescribed approval request message via the control unit 113 to the speech synthesis unit 103 or the display 106. In the speech storage unit 108, the speech input again and coming from the control unit 113 is stored in association with the result of speech recognition performed by the isolated word recognition unit 109.

In the data storage unit 111, the profile information specific to persons who can be the dialogue partner, such as mail addresses and birthdays, is stored in association with text (associated text). For example, as shown in FIG. 9, the data storage unit 111 stores the mail addresses (profile information) and names or nicknames (associated text) of such persons. Most names and nicknames are proper nouns. Therefore, names and nicknames are difficult to recognize correctly. Nonetheless, the name or nickname of a person is usually used first in a dialogue sentence, as the user addresses that person. In view of this, names and nickname, if stored as associated text, greatly helps to enhance the usability of the apparatus, because it reduces the text inputting time in the speech recognition. Moreover, the proper noun identifying the dialogue partner may be use as a standby word in the continuous speech recognition unit 110 or in the isolated word recognition unit 109. The user may add or delete words to the data storage unit 111 or to change the content of the data storage unit 111. The content of the data storage unit 111 is read by the response-text generation unit 112 via the control unit 113.

The response-text generation unit 112 generates a response text by the method that accords with the switching instruction input from the control unit 113. The method of generating the response text is a method that uses the result of the continuous speech recognition performed by the continuous speech recognition unit 110, a method that utilizes the result of the isolated word recognition performed by the isolated word recognition unit 109, or a method that utilizes a voice mail generated from the content of the speech storage unit 108. Any one of these methods is designated by the switching instruction. For example, to generate a voice mail is to append an audio file to the response text, so that the dialogue partner who has received the response text may refer to the audio file. The response-text generation unit 112 inputs the response text, thus generated, to text transmitting and receiving unit 101 through the control unit 113.

The control unit 113 has a processor such as a central processing unit (CPU). The control unit 113 is configured to control the other components of the dialogue generation apparatus and to supply and receive information and data to and from the other components. For example, the control unit 113 outputs a message informing of the receipt of text, to the speech synthesis unit 103 and the display 106, causes the display 106 to display the message, causes the speaker 104 to generate an alarm, melody or music, vibrates the dialogue generation apparatus, or causes a light emitting diode (LED) to emit light on and off, thereby informing the user that apparatus has received text from the dialogue partner.

How the dialogue generation apparatus of FIG. 1 operates will be explained with reference to FIG. 2.

First, the text transmitting and receiving unit 101 receives text, such as an electronic mail, from the dialogue partner (Step S201). Next, the morphological analysis unit 102 performs morphological analysis on the text received in Step S201 (Step S202). Further, the speech synthesis unit 103 generates a speech signal corresponding to the text received in Step S201, from the result of the morphological analysis performed in Step S202. The speech signal is supplied to the speaker 104, which generates the speech represented by the speech signal (Step S203).

Figure 4:
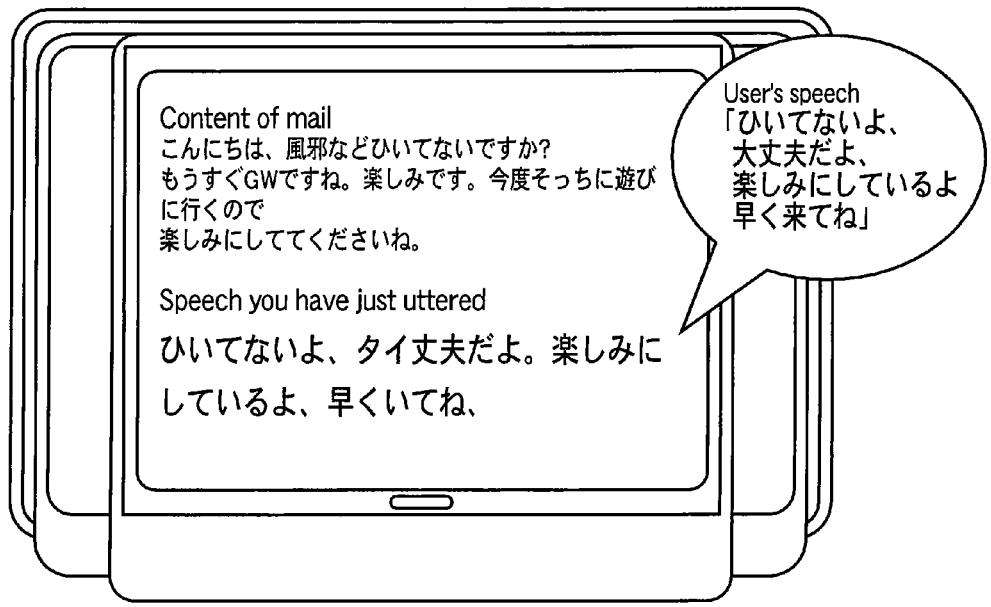
FIG. 4 is a diagram showing an example image that the display shown in FIG. 1 may display.

Hearing the speech generated in Step S203, the user produces a response to the microphone 105 (Step S204). The continuous speech recognition unit 110 recognizes the speech the user has uttered in Step S204. Thus, speech recognition (i.e., continuous speech recognition) is performed on the speech (Step S205). The display 106 displays the speech recognition result (i.e., continuous speech recognition result) performed in Step S205, as is illustrated in FIG. 4 (Step S206).

Figure 3:
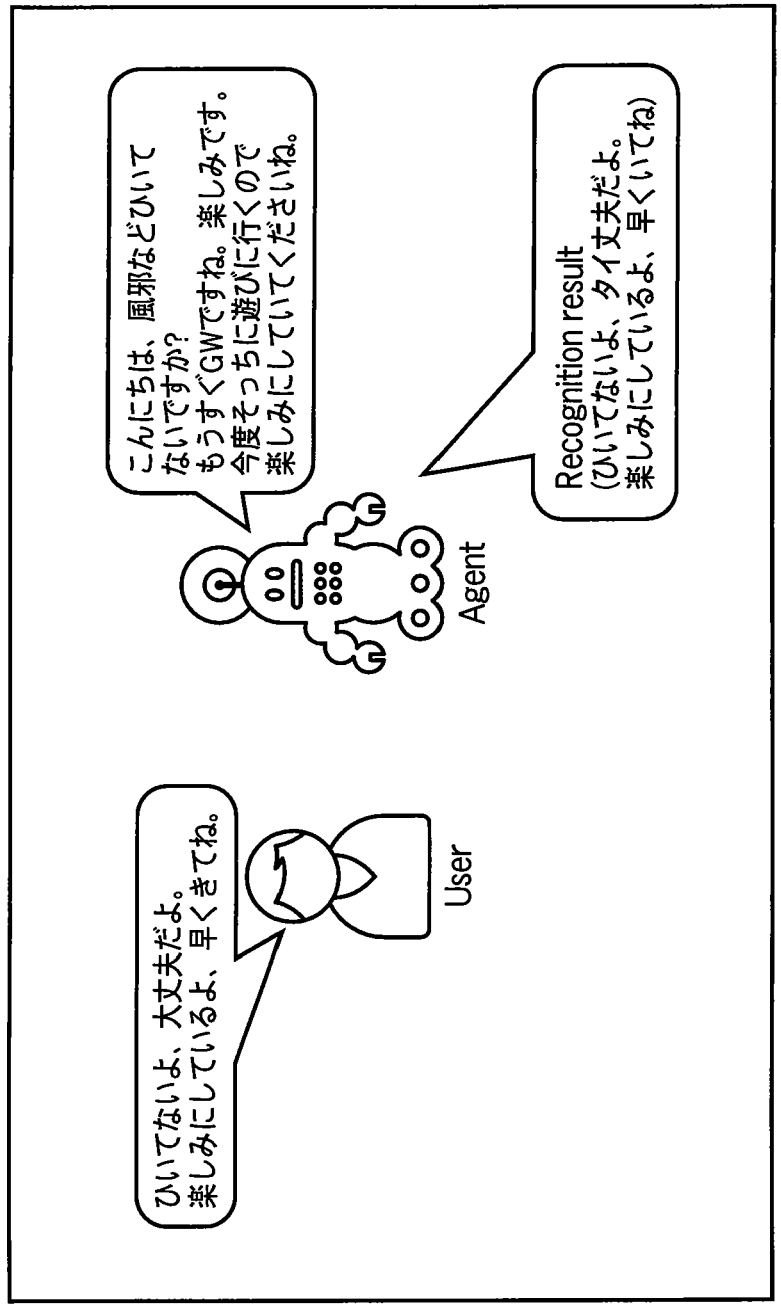
FIG. 3 is a diagram showing an example dialogue that may be produced by the dialogue generation apparatus of FIG. 1.

FIG. 3 shows an example dialogue between the user and an agent (i.e., agent of the dialogue partner), which may be produced as the dialogue generation apparatus of FIG. 1 performs Steps S203 to S206. In the case shown in FIG. 3, the speaker 104 produces the agent's speech "こんにちは、風邪などひい てないですか ?もうすぐ GWですね。楽しみです。今度 そっちに遊びに 行くので楽し みにしていて ください ね" (Step S203). In response to the agent's speech, the user talks, "ひいてないよ、大丈夫だよ。楽しみにし ているよ、早くきてね" to the microphone 105, which generates a speech signal (Step S204). The continuous speech recognition unit 110 performs speech recognition (Step S205). The display 106 displays the speech of "ひいてないよ、タイ丈夫だよ。楽しみにし ているよ、早くいてね". The dialogue generation apparatus is illustrated in FIG. 3 as a robotic terminal called an "agent." The dialogue generation apparatus is not limited to such a robotic terminal, nonetheless.

Figure 5:
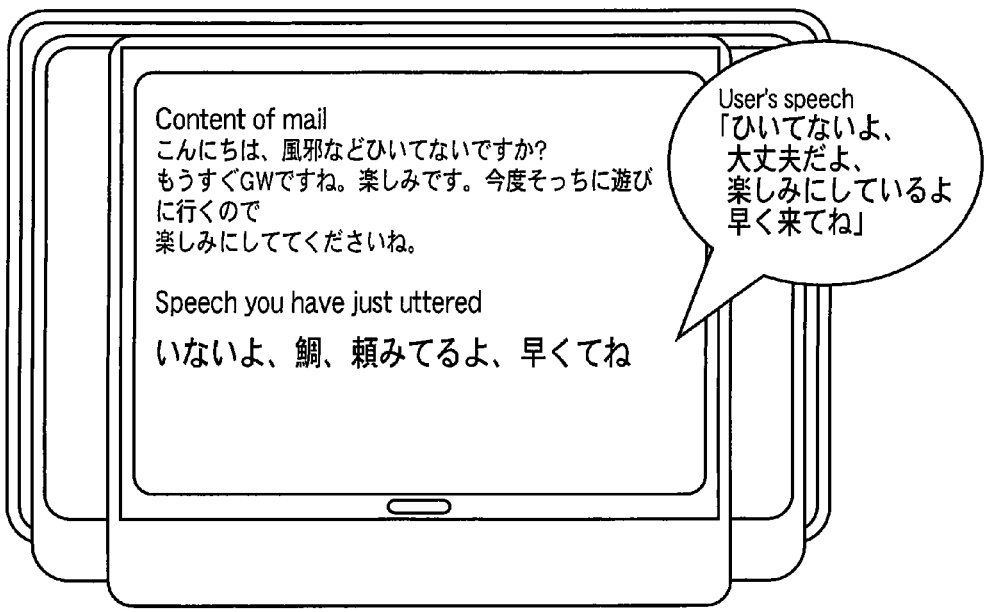
FIG. 5 is a diagram showing another example image that the display shown in FIG. 1 may display.
Figure 6:
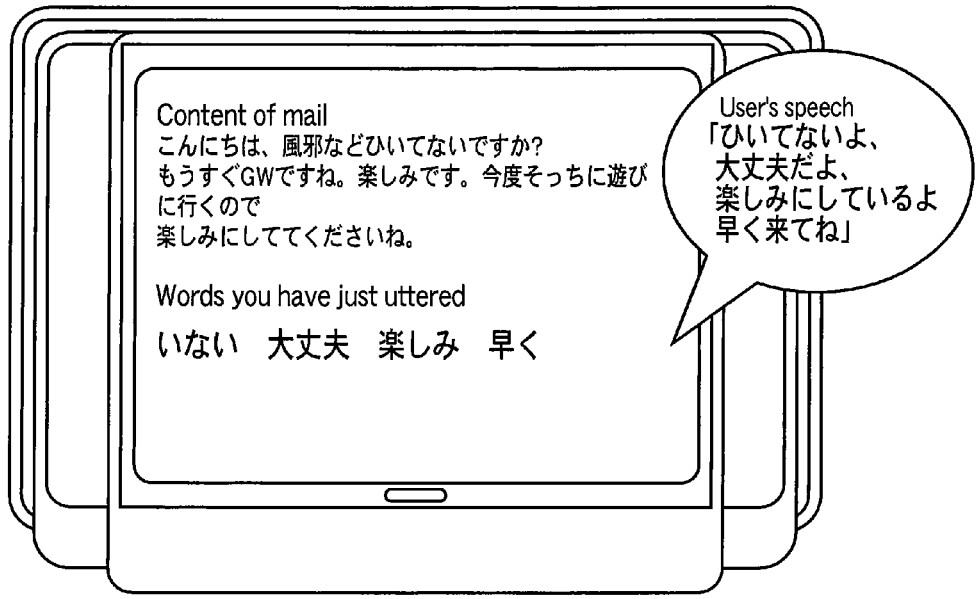
FIG. 6 is a diagram showing still another example image that the display shown in FIG. 1 may display.

The user may not be satisfied with the speech recognition result the display 106 displays in Step S206. If this is the case, the user operates the switching instruction unit 107, inputting a switching instruction. That is, if the speech recognition result thus displayed much differs from the speech he or she has uttered as shown in FIG. 5, the user can select a response-text selecting method that utilizes the isolated word recognition result. If the user inputs the switching instruction within a predetermined wait time (YES in Step S207), the process will go to Step S208. Otherwise (NO in Step S207), the process will go to Step S214.

In Step S208, the user produces the same speech again to the microphone 105, in response to the agent's speech uttered by the speaker 104 in Step S203. The isolated word recognition unit 109 performs speech recognition (more precisely, isolated word recognition) on the speech input again (Step S209). The control unit 113 causes the speech storage unit 108 to store the speech produced in Step S208, in association with the result of speech recognition (i.e., isolated word recognition) performed in Step S209 (Step S210). In the speech storage unit 108, the speech data may be stored as associated with the words constituting the speech recognition result, respectively, as shown in FIG. 8, or may be stored as associated with the entire speech recognition result, as illustrated in FIG. 11. Although the speech input again is shown as text in FIGS. 8 and 11, it is actually, for example, a speech file in a prescribed format. Next, the display 106 displays the speech recognition result obtained in Step S210 (Step S211).

Figure 7:
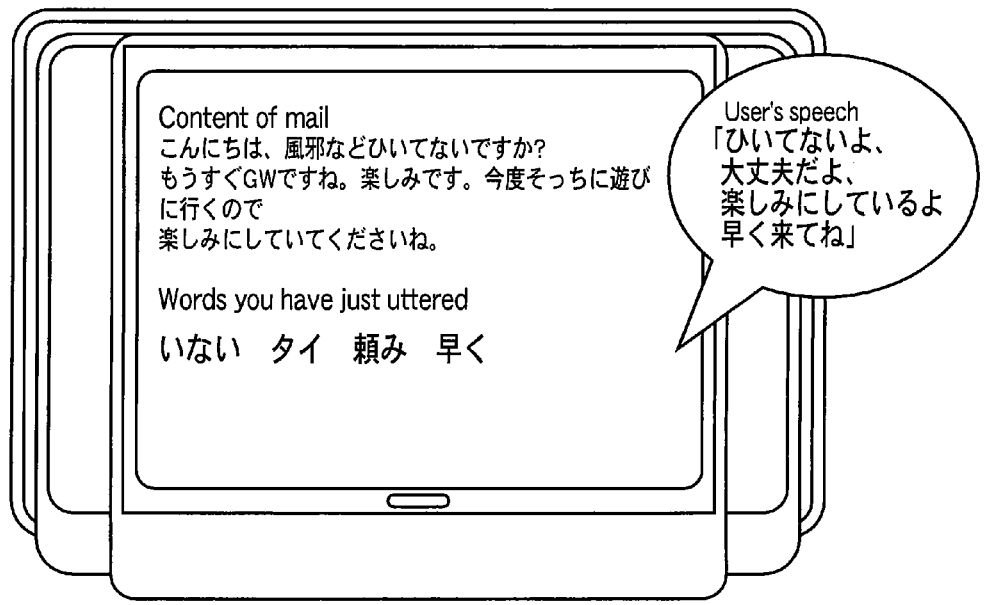
FIG. 7 is a diagram showing further example image that the display of FIG. 1 may display.

The user may not be satisfied with the speech recognition result displayed in Step S211. In this case, the user operates the switching instruction unit 107. That is, if the speech recognition result displayed much differs from the speech he or she has uttered as shown in FIG. 7, the user can select a response-text selecting method that utilizes voice mails. If the user inputs the switching instruction within a predetermined wait time (YES in Step S212), the process will go to Step S213. In Step S213, the response-text generation unit 112 reads the content of the speech storage unit 108 and generates a voice mail from the content. Otherwise (NO in Step S212), the process will go to Step S214.

In Step S214, the response-text generation unit 112 reads the profile information about the dialogue partner and the associated text of the dialogue partner from the data storage unit 111 through the control unit 113. Then, in Step S215, the response-text generation unit 112 generates a response text from the data read in Step S214 and at least one of the result of the continuous speech recognition performed in Step S205, result of the isolated word recognition performed in Step 209 and voice mail generated in Step S213. Then, the text transmitting and receiving unit 101 transmits the response text generated in Step S215 to the dialogue partner (Step S216).

In Step S215, the response-text generation unit 112 generates the response mail in the form of a response text that designates the mail address of the dialogue partner, i.e., miwako@softobank.jp (see FIG. 9), which has been read in Step S214. The response-text generation unit 112 first refers to the text tile of "ひさしぶり" as the subject of the response mail and then adds "RE:" indicating that the mail is a response, to the head of the text title. Phrase "RE: ひさしぶり"" is thereby generated.

The response-text generation unit 112 inserts the nickname of the dialogue partner, i.e., "みわこちゃん" (see FIG. 9) read in Step S214 as associated text of the dialogue partner, at the head of the response text. Moreover, the response-text generation unit 112 may add a greeting such as ""みわこちゃん、お誕生日 おめでとう (Happy Birthday!)," to the response text if the day the response text is generated happens to be the birthday of the dialogue partner. Further, the response-text generation unit 112 may insert, in the response text, a message of "こんにちは。風邪などひい てないですか?もうすぐ GW で すね。楽しみですね。今度そっちに 行くので楽し みにしていて 下さいね", adding symbol ">" usually used to denote a reference, to the head of the message. Still further, the response-text generation unit 112 inserts, as a response to the referred part, the result of isolated word recognition performed in Step S209 and the voice mail generated in Step S213. More precisely, the response-text generation unit 112 inserts a speech file from which to generate the phrases input again, i.e., "ひいてないよ," "大丈夫だよ," "楽しみにし ているよ" and "早く来 てね" (see FIG. 8) that correspond, respectively, to the words "いない," "タイ," "頼み," and "早く" that constitute the isolated word recognition result. These phrases are inserted in association with the words constituting the isolated word recognition result, respectively. The method of referring to the speech file is not limited in particular. Nonetheless, any one of the words constituting the isolated word recognition result inserted in the response text may be selected so that the response file associated with the word selected may be reproduced.

As shown in FIG. 12, the response-text generation unit 112 may insert the isolated word recognition result, i.e., "いない タイ 頼み 早く" (see FIG. 7), as response to the referred part, and may insert the speech input again and corresponding to isolated word recognition result, i.e., "ひいてないよ、大丈夫だよ、楽しみに しているよ 早く来てね" (see FIG. 11), in association with the isolated word recognition result so that the isolated word recognition result may be referred to. The method of referring to the speech file is not limited in particular. Nonetheless, if the isolated word recognition result, which is inserted in the response text, may be selected so that the speech file associated with the isolated word recognition result selected may be reproduced.

Moreover, the response-text generation unit 112 may insert the continuous speech recognition performed in Step S205 or the result of isolated word recognition performed in Step S209, as response to the referred part, depending on the method of generating the response text.

As described above, the dialogue generation apparatus according to this embodiment is designed to engage in a dialogue, by utilizing the profile information about the dialogue partner and the preset associated text of the dialogue partner. Hence, the dialogue generation apparatus can automatically insert the preset associated text in the response text, without requiring the user's labor of inputting the preset associated text in the form of speech. This can save the time of inputting data, on the part of the user. Further, the dialogue generation apparatus according to this embodiment generates a response text, using the continuous speech recognition result, the isolated word recognition result, or a voice mail. The apparatus can therefore generate a response text in an appropriate format even if the accuracy of speech recognition is influenced by environmental factors. Thus, the user need not input the speech repeatedly or give up inputting the speech.

Second Embodiment

Figure 13:
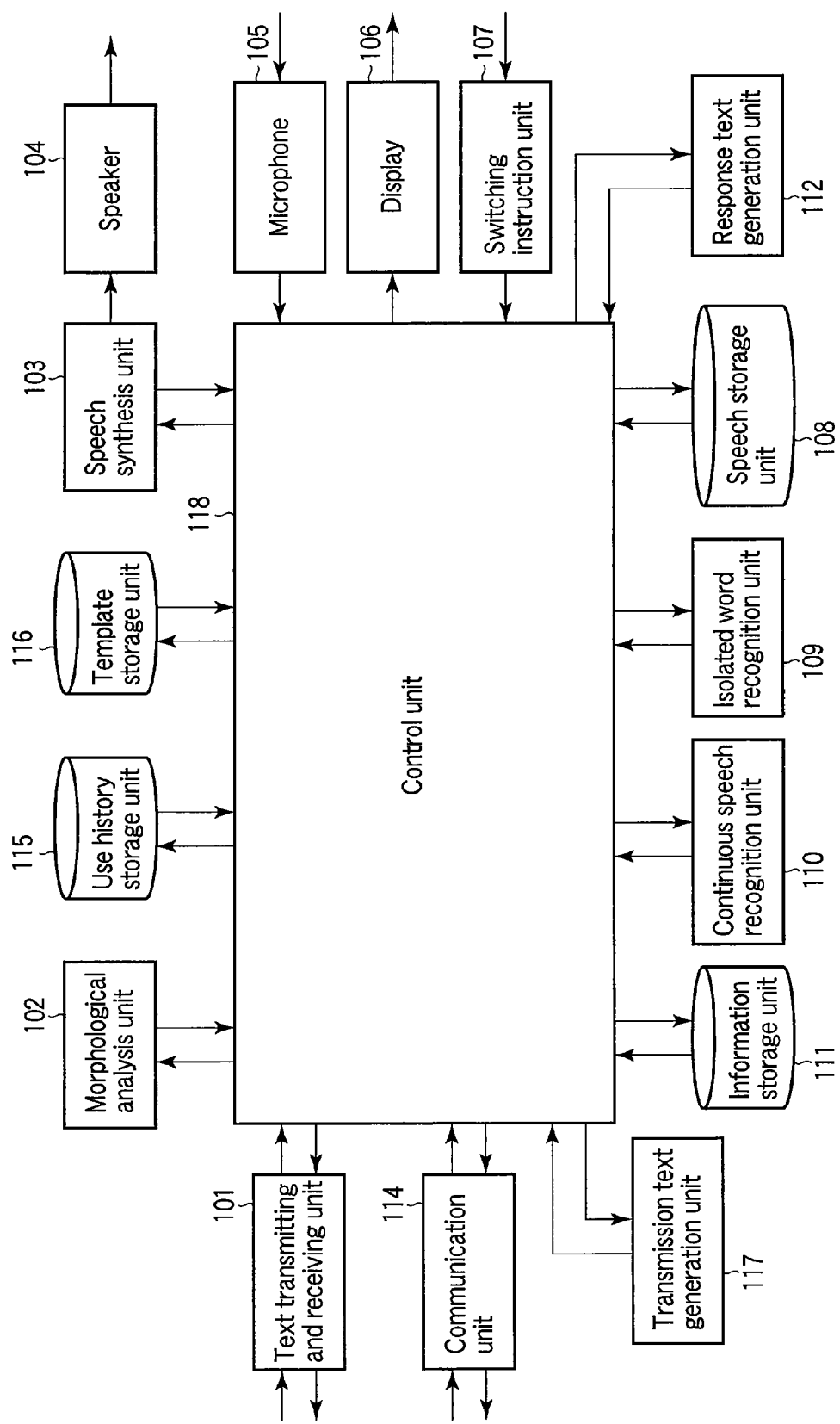
FIG. 13 is a block diagram showing a dialogue generation apparatus according to a second embodiment.

FIG. 13 shows the configuration of a dialogue generation apparatus according to a second embodiment of the present invention. As shown in FIG. 13, this apparatus differs from the dialogue generation apparatus of FIG. 1 in that a control unit 118 is provided in place of the control unit 113 and that a communication unit 114, a use history storage unit 115, a template storage unit 116, and a transmission text generation unit 117 are provided in addition. The components identical to those shown in FIG. 1 are designated by the same reference numbers. The components that characterize the apparatus of FIG. 13 will be described in the main.

The communication unit 114 uses a wireless network or a wired network, achieving communication between the dialogue generation apparatus of FIG. 13 and a household information appliance that has an interface that can communicate with the dialogue generation apparatus. The household information appliance may be a so-called "digital household appliance" such as TV, video recorder, audio player, or a so-called "white household appliance" such as microwave oven and air conditioner. The communication unit 114 acquires, by communication, use history information from the household appliance. The use history information represents the date and time of use and the type of the household appliance and attribute. The attribute differs from one household appliance to another. If the appliance is a TV or a video recorder, the attribute is the program the user has watched or recorded (e.g., title of the program, etc.). If the appliance is an audio player, the attribute is the music the user has played back (e.g., title of the music, etc.). If the appliance is a microwave oven, the attribute is the cooking menu the user has selected. If the appliance is an air conditioner, the attribute is the temperature the user has selected. The use history information is stored for the household appliance and transmitted to the dialogue generation apparatus of FIG. 13 at regular intervals or as demanded at the communication unit 114. The communication unit 114 supplies the use history information to the control unit 118, which in turn supplies the information to the use history storage unit 115. The use history storage unit 115 stores the use history information.

In the template storage unit 116, the use history information that may be stored in the use history storage unit 115 and an additional text that may be added to a response in accordance with the use history information are stored in association, as is illustrated in, for example, FIG. 15. The history information and the additional text, so stored in the template storage unit 116, constitute an additional text template. The "additional text" is so formatted that anything other than the user (for example, dialogue generation apparatus of FIG. 13) may recites the user's way of living, which is estimated from the use history information. The subject of the additional text (e.g., "ロボット (robot)" shown in FIG. 15) is registered, too, in the additional template and inserted, together with the additional text, in the transmission text (later described). In FIG. 15, "P" indicates that a random type of the household appliance has been substituted for, "NULL" indicates that no use history information is available for the household information appliance. Further, "★" indicates that an additional text is generated at random. That is, in the instance of FIG. 15, the additional text will be "(user)は (attribute)を食べたよ／飲んだよ。おいしかった？,((user) ate/drank (attribute). Was it good?)" "(attribute)を食べたよ／飲んだよ.おいしかった？,"" "(attribute)を食べたよ／飲んだよ."" or "(attribute)を食べたよ／飲んだよ."" if the household appliance is a microwave oven. Thus, any additional text related to a household appliance of the same type is generated, in part, at random, so that it may hardly be flat or dull.

As shown in, for example, FIG. 16, the use history information that may be stored in the history storage unit 115 and the subject name associated with the use history information are stored in the template storage unit 116, constituting a subject name template. The transmission text generation unit 117, which will be described later, selects one of the subject names stored in the template storage unit 116, which corresponds to the household appliance used longer than any other type on the day. Note that in FIG. 16, "A" indicates that the household appliances differ a little in use time on the day, and "N" indicates that the household appliances are used for a relatively short time on the day.

The transmission text generation unit 117 utilizes the use history information read from the history storage unit 115 through the control unit 118 and the additional text template and subject name template, both stored in the control unit 118. The transmission text generation unit 117 thereby generates a transmission text. More precisely, the transmission text generation unit 117 uses the additional text template, inserting the additional text in the transmission text, and requests the user for a comment on the additional text. If the user inputs speech via the microphone 105, the transmission text generation unit 117 inserts the result of speech recognition performed on the speech input, as a comment, in the transmission text. The transmission text generation unit 117 inputs the transmission text to the text transmitting and receiving unit 101 through the control unit 118. The control unit 118 has a processor such as CPU, and controls the other components of the dialogue generation apparatus of FIG. 13 and receives and supplies information and data.

How the transmission text generation unit 117 generates a transmission text will be explained with reference to FIG. 17. The transmission text generation unit 117 first reads the use history information stored in the history storage unit 115, then generates the subject ""今日はTV見たよ (I watched TV today)", which corresponds to the appliance type "TV" that is used longer than any other appliance on the day, from the subject name template stored in the template storage unit 116, and finally substitute the subject for the subject name of the transmission text. Further, the transmission text generation unit 117 generates "ロボット" that will become the subject of the additional text, from the additional text template (see FIG. 15) that is in the template storage unit 116, and then inserts the additional text in the transmission text. Next, the transmission text generation unit 117 reads a part of the use history information, e.g., [date=2008, Jun. 21, 12:00-12:30, appliance type=microwave oven, attribute=塩鮭 (salted salmon)]," and inserts, in the transmission text, an additional text ""おかあさんは 昼に塩鮭を食べたよ(Mum ate salted salmon at launch)" generated by using the additional text template.

Next, the transmission text generation unit 117 reads a part of the use history information, e.g., [date=2008, Jun. 21, 19:00-19:20, appliance type=microwave oven, attribute =鶏の照焼き ]," and inserts, in the transmission text, the additional text "夜に鶏の照焼きを食べたよ" generated by using the additional text template. The transmission text generation unit 117 reads another part of the use history information, e.g., [date=2008, Jun. 21, 19:25-19:30, appliance type=microwave oven, attribute =お酒] ]," and inserts, in the transmission text, an additional text ""お酒も飲んだよ。おいしかった ?" generated by using the additional text template.

When all additional texts concerning the appliance type "microwave oven" are generated as described above, they are displayed on the display 106 of the dialogue generation apparatus of FIG. 13, requesting that the user should utter a comment. The user may input speech such as ""おいしかった (It was good)" to the microphone 105. The speech input is supplied from the microphone 105 to the continuous speech recognition unit 110. The continuous speech recognition unit 110 performs speech recognition on the speech. The transmission text generation unit 117 inserts the speech recognition result, i.e., ""おいしかった,"" in the transmission text. The dialogue generation apparatus may request the user for a comment every time an additional text based on the first time of use history information is inserted, or may request the user for comments on all types of appliances after the additional texts about all appliances have been inserted in the transmission text.

Next, the transmission text generation unit 117 reads another part of the use history information, e.g., [date=2008, Jun. 21, 19:30-21:15, appliance type=TV, attribute=プロ野球巨阪ーソフトクリーム戦], and inserts, in the transmission text, an additional text ""夜にプロ野球巨阪ーソフトクリーム戦を見たよ."" generated by using the additional text template, together with the subject of the additional text, i.e., "ロボット.". Thus, the dialogue generation apparatus of FIG. 13 requests the user for a comment when an additional text about the appliance type of "TV" is generated. In response to the request, the user inputs a comment ""一生懸命応援したわよ"" to the microphone 105. The continuous speech recognition unit 110 performs speech recognition on the speech thus input, providing a speech recognition result, i.e., "一生懸命応 援したわよ".. The transmission text generation unit 117 inserts the speech recognition result, i.e., "一生懸命応援 したわよ," in the transmission text.

As has been described, the dialogue generation apparatus according to this embodiment utilizes the use history information about any one of the user's household appliances, thereby inserting an additional text in a transmission text and ultimately generating a transmission text. The dialogue generation apparatus according to this embodiment can therefore give the user a clue to topics, even in a conversation that may otherwise be most likely flat and dull. This helps the user to keep on talking with the dialogue partner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The embodiments described above have been described on the assumption that the texts are all in Japanese. Nevertheless, it should be evident to any person skilled in the art that the present invention can achieve the same advantages if the texts are in any other languages such as English and Chinese.

Moreover, various changes and modifications can, of course, be made without departing from the scope and spirit of the present invention.

What is claimed is:

1. A dialogue generation apparatus comprising:
   a reception unit configured to receive a first text from a dialogue partner;
   an information storage unit configured to store profile information specific to a person who is the dialogue partner and a fixed-pattern text associated with the person;
   a presentation unit configured to present the first text to a user;
   a speech recognition unit configured to perform speech recognition on speech the user has uttered about the first text presented to the user, and generate a speech recognition result showing content of the speech;
   a generation unit configured to generate a second text from the profile information about the dialogue partner, fixed-pattern text about the dialogue partner, and the speech recognition result;
   a transmission unit configured to transmit the second text to the dialogue partner;
   a communication unit configured to communicate with a household information appliance the user uses, and acquire use history information representing the user's use of the household information appliance;
   a use history storage unit configured to store the use history information; and
   a template storage unit configured to store an additional template including the use history information and an additional text,
   wherein the generation unit generates the second text by utilizing the additional text and the result of the speech recognition performed on the user's speech about the additional text,
   wherein the additional text recites a user's way of living, is estimated from the use history information, and is, at least in part, randomly generated.

2. The apparatus according to claim 1, further comprising an input unit configured to receive, from the user, a switching instruction for switching of a method of generating the second text;
   wherein the speech recognition unit includes a continuous speech recognition unit configured to perform continuous speech recognition on the speech to acquire a continuous speech recognition result, and an isolated word recognition unit configured to perform isolated word recognition on the speech to acquire an isolated word recognition result, and outputs either the continuous speech recognition result or the isolated word recognition result, as the speech recognition result, in accordance with the switching instruction.

3. The apparatus according to claim 2, further comprising a speech storage unit configured to store the speech as a speech file,
   wherein the generation unit generates the second text in association with the speech file, so that the second text is referred to in accordance with the switching instruction.

4. The apparatus according to claim 1, wherein the template storage unit further stores the use history information and a subject name template including the use history information and a subject name associated with the use history information, and the generation unit generates the second text by utilizing the subject name associated with the use history information.

5. The apparatus according to claim 1, wherein the use history information includes at least one of data items representing the use time, type of the appliance the user has used and attribute.

6. A dialogue generation method comprising:
   receiving a first text from a dialogue partner;
   storing profile information specific to a person who is the dialogue partner and a fixed-pattern text associated with the person;
   presenting the first text to a user;
   performing speech recognition on speech the user has uttered about the first text presented to the user, and generating a speech recognition result showing content of the speech;
   generating a second text from the profile information about the dialogue partner, fixed-pattern text about the dialogue partner, and the speech recognition result;
   transmitting the second text to the dialogue partner;
   communicating with a household information appliance the user uses, to acquire use history information representing the user's use of the household information appliance;

storing the use history information; and storing an additional template including the use history information and an additional text, wherein the second text is generated by utilizing the additional text and the result of the speech recognition performed on the user's speech about the additional text, wherein the additional text recites a user's way of living, is estimated from the use history information, and is, at least in part, randomly generated.

7. A dialogue generation apparatus comprising:

a communication unit configured to communicate with a household information appliance a user uses, and acquire use history information representing the user's use of the household information appliance;

a use history storage unit configured to store the use history information;

a template storage unit configured to store an additional template including the use history information and an additional text;

a speech recognition unit configured to perform speech recognition on speech the user has uttered about the additional text, and generate a speech recognition result showing content of the speech;

a generation unit configured to generate a text for transmission by utilizing the additional text and the speech recognition result; and a transmission unit configured to transmit the text for transmission to a dialogue partner, wherein the additional text recites a user's way of living, is estimated from the use history information, and is, at least in part, randomly generated.

8. A dialogue generation method comprising:

communicating with a household information appliance a user uses, to acquire use history information representing the user's use of the household information appliance;

storing the use history information;

storing an additional template including the use history information and an additional text;

performing speech recognition on speech the user has uttered about the additional text, and generating a speech recognition result showing content of the speech;

generating a text for transmission by utilizing the additional text and the speech recognition result; and transmitting the text for transmission to a dialogue partner, wherein the additional text recites a user's way of living, is estimated from the use history information, and is, at least in part, randomly generated.

* * * * *